United States Patent [19]

Wolf

[11] Patent Number: 4,650,410

[45] Date of Patent: Mar. 17, 1987

[54] MACHINE FOR PRODUCING SMALL MOUNDS OF AN ALMOND FRAGMENT/CHOCOLATE MASS SUBSTANCE

[75] Inventor: Lothar Wolf, Bad Salzuflen, Fed. Rep. of Germany

[73] Assignee: Lothar A. Wolf Spezialmaschinen GmbH, Bad Salzuflen, Fed. Rep. of Germany

[21] Appl. No.: 793,629

[22] Filed: Oct. 31, 1985

[30] Foreign Application Priority Data

Nov. 2, 1984 [DE] Fed. Rep. of Germany ....... 3440011

[51] Int. Cl.⁴ ............................................. B29C 17/14
[52] U.S. Cl. ....................................... 425/92; 425/103; 425/215; 425/232; 425/257; 426/306; 426/512; 99/450.1; 118/16; 118/22
[58] Field of Search ................... 99/450.1; 118/16, 25, 118/13, 22; 425/90, 92, 98, 103, 110, 215, 218, 225, 232, 256, 257; 426/306, 512

[56] References Cited

U.S. PATENT DOCUMENTS

| | | | |
|---|---|---|---|
| 4,025,267 | 5/1977 | Amato et al. | 425/257 X |
| 4,032,667 | 6/1977 | Kreuter | 426/306 |
| 4,197,794 | 4/1980 | Razue et al. | 99/450.1 |
| 4,420,295 | 12/1983 | Clear et al. | 425/92 |
| 4,431,678 | 2/1984 | Sollich | 426/306 |

FOREIGN PATENT DOCUMENTS

| | | | |
|---|---|---|---|
| 1346434 | 11/1963 | France | 118/22 |
| 2366795 | 6/1978 | France | 118/16 |

*Primary Examiner*—Charles Hart
*Attorney, Agent, or Firm*—Erwin S. Teltscher; Peter R. Ruzek

[57] ABSTRACT

A machine for producing small mounds of a solidifiable substance, especially an almond fragments/chocolate mass mixture, includes a plurality of adjacent troughs which delimit respective substantially coextensive parallel channels, each of which includes a succession of an upstream mixing section, an intermediate sieving section, and a downstream settling section, which opens onto an unloading conveyor. The substance is introduced in a predetermined quantity into the respective mixing sections, at which it is subsequently engaged and advanced by one of a plurality of individual pusher elements of a multiple pusher. The multiple pusher moves, during each cycle of operation, through an advancement movement, during which the metered quantity of the substance is advanced by a predetermined distance through the mixing, sieving or settling channel section, in that order, a lifting stroke during which all of the individual pusher elements are moved opposite to the advancement direction outside the channel, and a lowering stroke, during which the individual pusher elements re-enter the channel.

15 Claims, 3 Drawing Figures

MACHINE FOR PRODUCING SMALL MOUNDS OF AN ALMOND FRAGMENT/CHOCOLATE MASS SUBSTANCE

The present invention relates to a machine for making small mounds of solidifiable substances in general, and more particularly to a machine for producing such mounds from an almond fragment/chocolate mass mixture.

There are already known machines of the above-type. In one of them, which is disclosed in the published German Patent Application DO-OS No. 29 10 379, there is formed an advancement path by an endless chain conveyor which carries, in a plurality of entraining plates, a number of adjacently disposed containers serving as sieves. At the beginning of the advancement path, there are arranged, in succession, a first chocolate mass metering arrangement, an almond fragment metering arrangement, and a second chocolate mass metering arrangement, so that first a layer of the chocolate mass is introduced into the sieving containers, then a metered amount of almond fragments is admitted into the sieving containers on top of the chocolate layer, and finally another chocolate layer is poured on top of the almond fragments. In this arrangement, an excess amount of chocolate is being used, this excess amount of chocolate being subsequently removed by sieving during passage of the sieving containers through a shaking arrangement. In this manner, it is possible to produce almond fragment/chocolate mass mounds, which contain exactly the desired amounts of the almond fragments and of the chocolate mass, without incurring the risk of breakage or pulverization of the sensitive and brittle almond fragments.

However, in view of the multitude of entraining plates which are provided, each carrying a plurality of sieving containers or housings arranged adjacent to one another, a machine of this type has a relatively complicated construction, and its throughput can be increased only to a limited extent, inasmuch as a supportable upper limit of the realizable advancement cycle is reached rather quickly in this advancement system and, for constructional reasons, even the width of the entraining plates arranged between the two chains, and thus the number of the adjacently arranged sieving housings carried by the respective entrainment plate, is limited. What further adds to the relatively complex construction of this known arrangement is the fact that, for all intents and purposes, a separate ejector must be provided for each of the sieving housings.

SUMMARY OF THE INVENTION

Accordingly, it is a general object of the present invention to avoid the disadvantages of the prior art.

More particularly, it is an object of the present invention to provide a machine for producing small mounds, especially of an almond fragment/chocolate mass mixture, which does not possess the drawbacks of the known machines of this type.

Still another object of the present invention is to so construct a machine of the type here under consideration as to achieve a considerable improvement in its throughput relative to that of known machines.

It is yet another object of the present invention to so design a machine of the above type as to be relatively simple in construction, inexpensive to manufacture, easy to use, and nevertheless reliable in operation.

In keeping with these objects and others which will become apparent hereafter, one feature of the present invention resides in a machine for producing small mounds of a solidifiable substance, especially a mixture of almond fragments with a chocolate mass, which machine comprises at least one trough which mounts an elongated channel having in sequence as considered in one longitudinal direction of the channel a mixing channel section, a sieving channel section and a settling channel section; the trough has a perforated bottom wall of the sieving channel section. There are provided means for introducing a metered quantity of the substance into the mixing channel section during a supply phase of an operating cycle of the machine; and means for advancing this quantity during an advancement phase of the cycle through the mixing, sieving and settling channel sections and ultimately out of the settling channel section.

Such advancing means include a multiple pusher including a plurality of individual pusher elements arranged sequentially as considered in the longitudinal direction of the channel at a predetermined distance from one another, and extending into the channel at least during the advancement phase, and means for moving the individual pusher elements in such a manner as to contact the metered quantity and push the same ahead of itself through the respective channel section during the advancement phase. Advantageously, there is further provided at least one additional trough bounding an additional channel adjacent to, and substantially coextensive with the aforementioned channel, and also having the mixing, sieving and settling channel sections.

Then, the introducing means further includes means for introducing an additional metered quantity of the substance into the mixing channel section of the additional channel, and the multiple pusher includes an additional plurality of individual pusher elements similar to the aforementioned plurality and being jointly movable therewith, and extending into the additional channel at least during the advancement phase. It is further advantageous when the multiple pusher includes a carrying structure on which the individual pusher elements are rigidly mounted, and if the moving means includes means for causing the carrying structure with the individual pusher elements to move during each cycle in a predetermined path having an advancement segment in the one longitudinal direction, a lifting segment normal to this direction and with the individual pusher elements being withdrawn from the channel, a return segment opposite to this direction and with the individual pusher elements remaining withdrawn from the channel, and a lowering segment normal to this direction and with the individual pusher elements reentering the channel.

The trough or troughs which are being now used in accordance with the present invention are constituted by easily manufacturable shaped parts, such as made of sheet metal. Even the multiple pusher consists, as far as its basic principle is concerned, of a simple frame equipped with the individual pusher elements which are again relatively simple and are constituted by shaped parts which are fitted to the cross section of the channel. Finally, even the above-discussed, so-called pilgrim, step-wise movement of the multiple pusher can be realized, as far as the construction of the driving or moving means in concerned, in a relatively simple manner. It is to be emphasized in this context is also that, at least on the basis of the constructional principles involved, basically a large number of adjacently arranged troughs can be used if so desired or required, and the multiple pusher can be easily constructed with a sufficient width to cover all troughs and to have the requisite number of the individual pusher elements arranged in respective pluralities as well as in transverse alignment with one another, so that a machine of this type can consequently be constructed for a very high throughput.

It has been suprisingly established that the intermittent advancement movement of the metered quantity of the almond fragment/chocolate means substance commencing at the upstream end of the mixing channel section and continuing through this section while using several of the sucessive ones of the pusher elements not only results in a good admixture of the almond fragments with the chocolate mass, which is additionally protective of the fragile almond fragments, but this can also occur in a cyclical manner relatively rapidly, thus resulting also in a large troughput. This is also applicable to the following advancement of the substance through the subsequently arranged sieving channel section, in which the originally provided excess chocolate is sieved off due to a shaking or vibratory motion to which the substance is subjected to at this location. The aforementioned settling channel section serves primarily the purpose of bridging the necessary gap or space provided between a collecting receptacle arranged underneath the sieving channel section and a following unloading conveyor, or a similar transportation means, which, in turn, may pass through a cooling arrangement.

What contributes to a simplified construction of the machine of the present invention is the fact that only a single chocolate metering or dosing arrangement need be provided in the machine.

It has been established that, in relation to the above-discussed known machine, the cycling speed of the mound production can be almost doubled while maintaining the quality of the almond fragment mounds with respect to the exact dosage of the chocolate and almond fragments, their intimate mixing, and prevention of almond fragment breakage or pulverization. Additionally, in the case of need, because of the basic principles embodied in the machine of the present invention, a multitude of the small mounds can be simultaneously produced side-by-side by providing a corresponding number of adjacently situated troughs.

Further features of the present invention will become apparent as the description proceeds and from the accompanying claims. In this connection, special emphasis is to be put on the specific construction of the launching element of the multiple pusher, the heating of the launching element, as well as on the special construction of a scraping arrangement for the individual pusher elements.

BRIEF DESCRIPTION OF THE DRAWING

A currently preferred embodiment of the machine of the present invention will become apparent from the accompanying drawing, in which.

DETAILED DESCRIPTION OF THE PREFERRED EMBODIMENT

Figure 1:
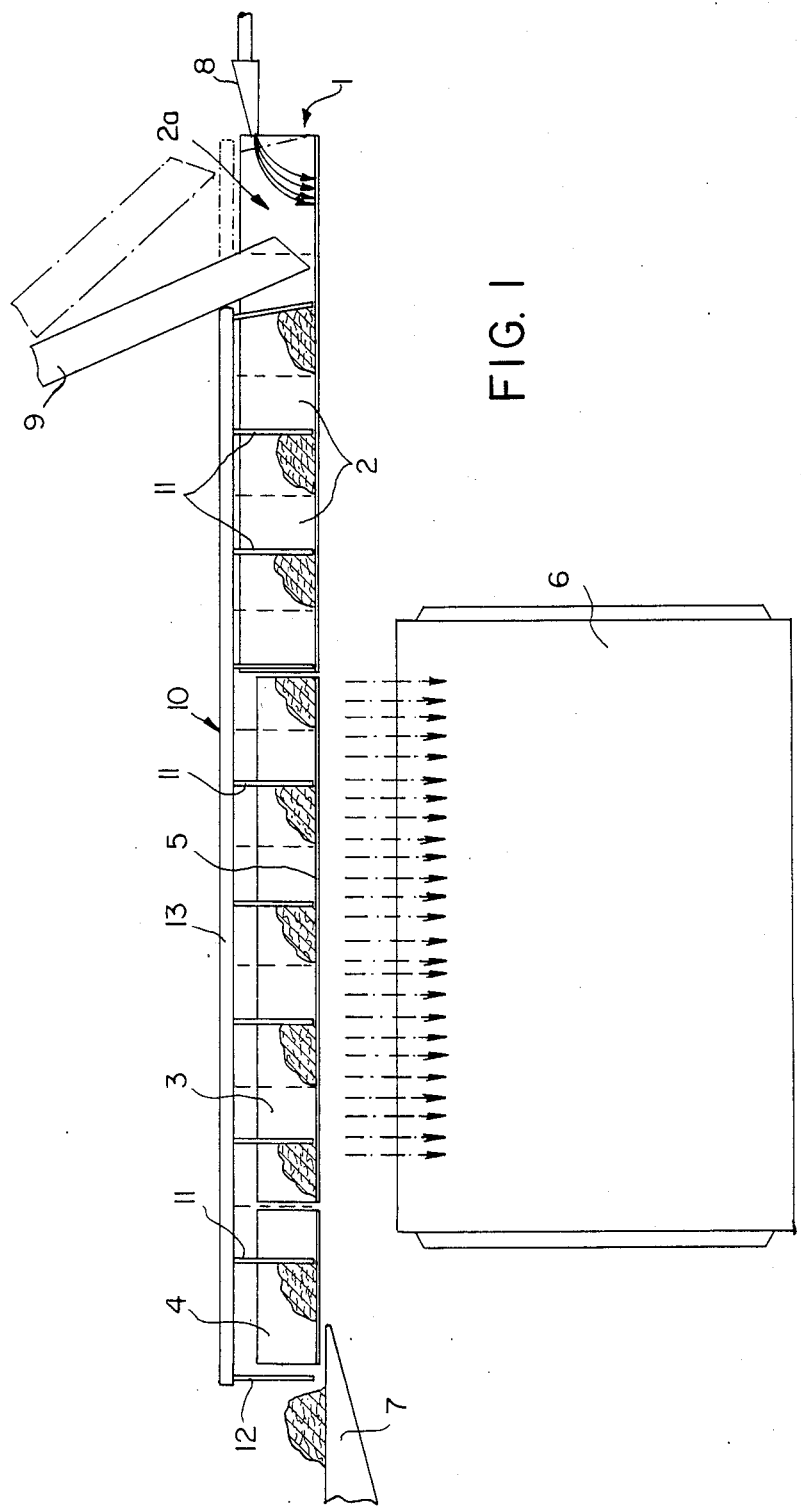
FIG. 1 is a diagrammatic sectional side elevational view of the machine of the present invention.
Figure 3:
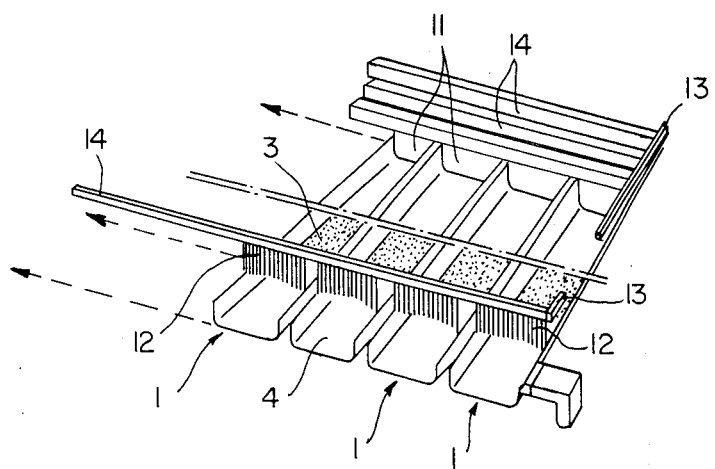
FIG. 3 is a simplified perspective view of the machine of the invention including a plurality of adjacent troughs, as well as a multiple pusher common to all such troughs.

Referring now to the drawing in detail, and first to FIG. 1 thereof, it may be seen that the reference numeral 1 has been used therein to identify a trough which bounds a channel. As shown in FIG. 3, a plurality of such troughs 1 may be advantageously arranged next to and substantially coextensively with one another. However, in the following description, only one trough 1 will be described in detail, it being understood that the other troughs 1, if provided, have the same or similar constructions and configurations as the specifically described trough 1.

The trough 1 serves for the advancement of a mixture of fragmentary material with a coating material from an upstream end to a downstream end of the aforementioned channel of the trough 1. In the following, the present invention will be discussed as employed in the fabrication of small almond fragment/chocolate mass mounds; however, it will be appreciated that it could just as well be used in conjunction with other edible solid or semi-solid materials, such as fragments of, or even whole, walnuts, hazelnuts, peanuts or pecans, to name a few, and also with coating or binding materials other than chocolate.

As shown in particular in FIG. 1, the trough 1 delimits three different consecutive sections, namely commencing at the upstream end of the channel, a mixing channel section 2, followed in the downstream direction by a sieving channel section 3, and ultimately a settling channel section 4. All of the channel sections 2, 3 and 4 have substantially the same cross-sectional shapes.

Mixing of a chocolate mass and of almond fragments takes place at least predominantly in the mixing channel section 2 of the trough 1, as will be discussed in more detail later. An excessive amount of chocolate mass is initially fed to the machine. The excess chocolate is then sieved off in the sieving channel section 3 to the exact dosage of the desired chocolate amount in the respective mound. To this end, the trough 1 has a bottom wall 5 which is perforated in a sieve-like fashion at the region of the sieving channel section 3, and a vibratory drive of any known construction, which has not been shown in the drawing, is associated with the perforated bottom wall 5, which may advantageously be separate from the remainder of the trough 1. A collecting receptacle 6 for the chocolate sieved off in the sieving channel section 3 of the trough 1 is situated underneath such sieving channel section 3.

If a plurality of the troughs 1 is being used, as mentioned before, the receptacle 6 is advantageously shared by all of such troughs 1, that is, it is located underneath all of the sieving channel sections 3 of such adjacent troughs 1.

The necessary space which is to be provided between the respective downstream end of the collecting receptacle 6 and an unloading conveyor 7, which can, for example, subsequently pass through a cooling zone or channel, is bridged by the settling channel section 4. The unloading conveyor 7 is advantageously so wide as to receive the mounds emerging from the downstream end of the respective settling channel section 4 and, when a plurality of the troughs 1 is arranged next to one another, to receive the mounds emerging from the downstream ends of all of the settling channel sections of such adjacent troughs 1.

The upstream zone of the mixing channel section 2 of the trough 1 serves as a dosing zone 2a. An outlet end 8 of a chocolate metering arrangement, which is of any known construction, and thus has not been illustrated, but which may essentially include a supply container and a subsequent metering piston pump for the supply of the desired amount of the chocolate mass from the container into the outlet end 8, opens, on one hand, into the dosing zone 2a. Of course, when a plurality of the troughs 1 is provided, there will be provided a plurality of the outlet ends 8, each leading from the chocolate metering arrangement to one of the dosing zones 2a, the number of such outlet ends 8 corresponding to the number of the troughs 1.

On the other hand, a supply trough or duct 9, or a plurality of such supply ducts 9, each associated with one of the troughs 1 if more than one trough 1 is provided, commencing at an almond fragment metering device, which again has a construction that is well known and hence need not be illustrated, opens from above into the dosing zone 2a, or into the respective associated dosing zones 2a. The aforementioned almond fragment metering device may, for instance, include a supply container and a subsequent metering drum of a conventional construction.

For the advancement or transport of the small mounds which are formed in this manner through the channel of the trough 1, as well as for the mixing of the chocolate mass with the almond fragments in the mixing channel section 2, there is provided a multiple pusher 10, which is constructed, mounted and moved in a special manner, as will become apparent hereafter. This multiple pusher 10 includes, as viewed in the direction of advancement of the small mounds through the channel of the trough 1, a succession of individual pusher elements 11, which are arranged at respective predetermined distances from each other in the advancement direction. Furthermore, in the illustrated construction according to the present invention, a launching element 12, which will be discussed in more detail later, is arranged at the downstream end of the sucession of the individual pusher elements 11 and constitutes a terminating member of such succession.

Figure 2:
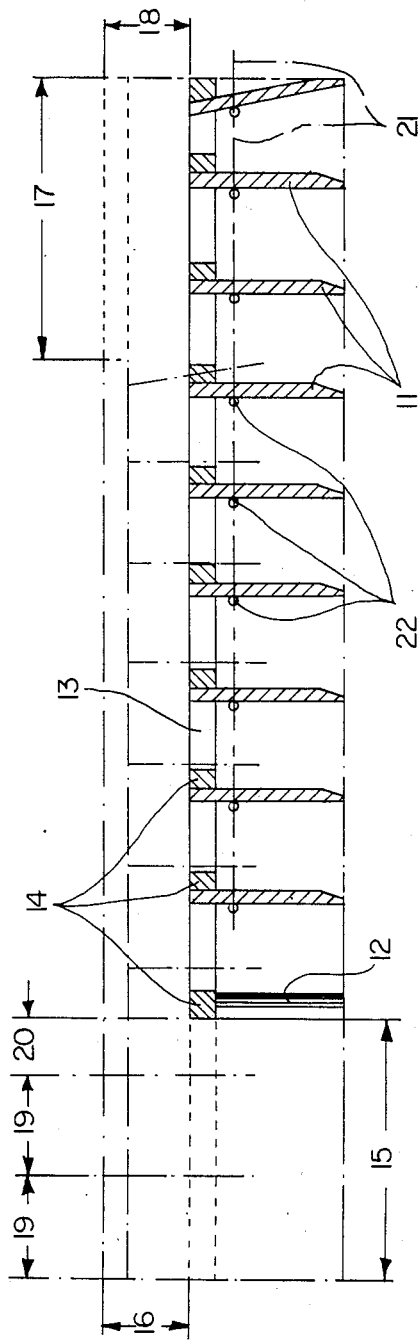
FIG. 2 is a somewhat more detailed view similar to FIG. 1 and additionally indicating a movement scheme of a multiple pusher of the machine of the present invention.

More particularly, as seen especially in FIG. 2 of the drawing, the multiple pusher 10 includes a carrying frame 13, on which there is provided a plurality of transverse carrier elements 14, on which, in turn, there are mounted at the abovementioned predetermined distance from one another, as considered in the advancement direction, the respective individual pusher elements 11. As evident in FIG. 3, when a plurality of the troughs 1 is provided, the carrying frame 13 and the transverse carrier elements 14 are dimensioned accordingly, that is, to be common to the pusher elements 11 and the launching elements 12 associated with all of the troughs 1, the pusher elements 11 and the launching elements 12 then being mounted on the respective transverse carrier elements 14 at distances as considered longitudinally of the transverse carrier elements 14 that correspond to the spacings of the channels of the adjacent troughs 1. Each of the individual pusher elements 11 has an outer contour which is well fitted to the cross-sectional configuration of the channel of the associated trough 1, that is, to the cross-sectional configurations of the channel sections 2, 3 and 4, so that the individual pusher element 11 essentially fills the cross section of the channel of the trough 1 at the respective channel sections 2, 3 or 4, at which it is located. Correspondingly shaped Teflon plates have been found to be particularly advantageous for this application and use.

The launching element 12, which is provided at one end of the multiple pusher arrangement associated with the trough 1, is preferably constructed as a metallic launching rake. Advantageously, a non-illustrated heating arrangement of a known construction is associated with the metallic launching rake or element 12.

The multiple pusher 10 arranged above the trough or troughs 1 is movable relative to the trough or troughs 1 in a reciprocating or step-wise pilgrim motion, including an advancing motion segment during which the individual pusher elements 11 and the launching element or elements 12 are lowered into the channel or channels of the trough or troughs 1, a subsequent lifting movement segment during which the multiple pusher 10 moves upwardly from the trough or troughs 1, a return movement segment during which the multiple pusher 10 is spaced from the channel or channels and moves opposite to the advancement direction to the starting point, and a lowering movement segment during which the individual pusher elements 11 and the launching element or elements 12 are lowered into the channel or channels of the trough or troughs 1. This sequential motion can be achieved by cyclically operating driving means which is of a known construction and hence has not been illustrated in the drawing. So, for instance, purely pneumatically or hydraulically achieved advancement, lifting, return, and lowering movements can be provided for the multiple pusher 10 by appropriate cylinder-and-piston units. It is also possible to achieve the aforementioned movement sequence by utilizing cam-operated control and driving means. In this instance, it is particularly advantageous to utilize cams which are driven from the main driving shaft of the machine in the desired timed sequence, and which respectively cause the individual movements during the above-mentioned movement segments. The movements of such individual cams are then transferred or applied to the multiple pusher 10 by cam follower rollers rotatably mounted on the carrying frame 13.

Having so described the construction of the arrangement of the present invention, the mode of operation of this arrangement will now be discussed as far as the details and peculiarities of the pusher movement cycle are concerned, with reference to the production of a group of almond fragment mounds.

When, with reference to FIG. 2 of the drawing, the multiple pusher 10 is situated at the left-hand end, as considered in the drawing, of its advancement stroke 15 provided therefor, and at the upper position of its lifting stroke 16, there occurs the material input into the respective dosing zone or zones 2a of the respective mixing channel section or sections 2 of the trough or of the adjacent troughs 1. However, it will be appreciated that this material input can take place at any time or during any period of the aforementioned lifting, return, and lowering movement strokes. During this material input operation, the almond fragments needed for the fabrication of the respective mounds are supplied into the respective dosing zones 2a, and chocolate mass is introduced into the respective dosing zones 2a in a predetermined excess amount. The multiple pusher 10 then moves back to the extent of its return stroke 17, and moves down in a lowering stroke 18, so that the illustrated nine individual pusher elements 11 per trough, which are arranged at predetermined substantially equal distances from one another, as well as the launching element 12, which is provided for each trough, are ultimately received in the channel or channels of the trough or troughs 1. Now, the multiple pusher 10 moves in its advancement stroke 15 and thus advances the dosed material in the leftward direction, as considered in the drawing, by a distance corresponding to the length of the advancement stroke 15, in one operating cycle. The intermittent advancement of the dosed material through the mixing channel section 2 by means of the pushing action of the respective individual pusher elements 11 results in an excellent mixing action of the almond fragments and the chocolate mass, with a good all-around coating of the almond fragments with the chocolate.

It is to be emphasized at this juncture that the return stroke 17, and thus, of course, also the equally long forward stroke 15, has such a length that it corresponds to one or two distances 19 between, the individual pusher elements 11 plus a safety distance 20, as illustrated in FIG. 2. The safety distance 20 has the purpose of assuring that the individual pusher elements 11, during their next following lowering movement stroke, occurring during the next following cycle of operation, do not destroy or damage the small mounds being formed, but rather that the individual pusher elements 11 re-enter the respective channel or channels at a rearward distance, substantially corresponding to the distance 20, from the respective small mounds being formed. The safety distance 20 may amount, for instance, to about one-half of the distance 19.

In the above-mentioned manner, the small mounds being formed are first intermittently advanced through the mixing channel section 2 with attendant thorough mixing, and then they are intermittently advanced by the respective individual pusher elements 11 through the respective sieving channel section or sections 3, in which the excess chocolate is sieved off. Thereafter, the small mounds are intermittently advanced into and through the settling channel section or sections 4 and, finally, are launched by the launching rake or rakes 12 onto the unloading conveyor 7.

It may be seen from the foregoing explanation that the production of the small mounds occurs continuously in the sense that during each cycle of the intermittent movement, there are performed the metering or dosing, mixing, sieving, settling, and launching operations.

The construction of the launching element 12 in the form of a rake including a plurality of individual metallic rods or tines has the advantage that the metallic tines can be, on the one hand, heated in a very simple manner, and on the other hand, can be arranged in any desired preselected relationship with respect to one another. So, for instance, an arrangement of the individual tines of the launching rake 12 along an arcuate path, as indicated in FIG. 3 of the drawing, is advantageous, inasmuch as in this manner it can be additionally acted on the small mounds during the launching thereof onto the unloading conveyor 7, in order to obtain the usually desired round shape of such small mounds. Herein, the heating of the launching rake 12 assures that the small mounds to be launched do not even have the tendency to stick to the launching rake 12; rather, they easily slide off from the launching rake 12. In accordance with an advantageous feature of the invention, the downstream end of the settling channel section 4 is situated several millimeters upwardly of the upstream end portion of the unloading conveyor 7, so that, as a result of this offset, the respective small mound being launched, after a slight tilting motion, is quasi-extracted from the downstream end of the settling channel section 4, and from the launching rake 12 by the unloading conveyor 7.

Inasmuch as it cannot be excluded that, even when the individual pusher elements 11 are made of Teflon or of a similar non-adhesive material, some of the chocolate mass will nevertheless adhere or become deposited over the course of time on the individual pusher elements 11, the present invention also provides a scraping arrangement which prevents any substantial build-up of the chocolate mass on their surfaces which come into contact with the small mounds. Such a scraping arrangement includes an additional frame, which is not shown in the drawing, and which is mounted in respective guides for reciprocating movement with the carrier frame 13 of the multiple pusher 10 in the advancement and return direction, but is prevented by such guides from conducting joint lifting and lowering movements with the multiple pusher 10. The additional frame is advantageously connected to the carrying frame 13 in a resilient manner. A plurality of scraping wires 22, one for each of the parallel individual pusher elements 11, are mounted on the additional frame and transversely span the same. When a plurality of the troughs 1 is provided, each of the wires 22 extends parallel to the forwardly facing major surfaces of a group of adjacently arranged individual pusher elements 11, each of which is associated with one of the troughs 1. The scraping wires are arranged along a horizontal central plane 21, which is situated approximately at the level of the lower end of the respective pusher element 11 when the multiple pusher is in its raised position. Since the scraping wires 22, during the shared movement with the multiple pusher 10 in the other respects, and under corresponding resilient connection with the multiple pusher 10, remain in this horizontal central plane 21 even as the multiple pusher 10 conducts its up and down movements, there is obtained scraping off of any adhering chocolate mass from the affected surface of the respective individual pusher element 11 by the scraping wire 22 associated therewith during the lifting and lowering movements of the multiple pusher 10.

In a deviation from the above-discussed construction, it is possible to construct several of the pusher elements 11 which are situated at the downstream end of the multiple pusher 10, that is, next to the launching element 12 as rake-shaped elements, in order to obtain an additional improved shaping possibility for the small mounds of the almond fragment/chocolate mass material, which are in the last phases of their formation. Furthermore, the very region of the settling channel section 4 can also be used to let other, additional shaping elements act on the small mounds entering or present in this region. So, for example, it is possible to perform the transfer of the small mounds from the settling channel section 4 onto the unloading conveyor 7 by means of a transporting arrangement which acts simultaneously as a shape-determining or re-shaping tool. While the invention has been illustrated in a preferred embodiment, it is not limited to the specific structures shown, since many variations thereof will be evident to one skilled in the art, and are intended to be encompassed herein as set forth in the following claims.

I claim:

1. A machine for producing small mounds of a solidifiable substance, especially a mixture of almond fragments with a chocolate mass, comprising, in combination, at least one trough which bounds an elongated channel, having in sequence, as considered in a longitudinal direction of said channel, a mixing channel section, a sieving channel section, and a settling channel section, said trough having a perforated bottom wall at said sieving channel section;

means for introducing a metered quantity of the substance into said mixing channel section during a supply phase of an operating cycle of the machine; and means for advancing said quantity during an advancement phase of said cycle through said mixing, sieving, and settling channel sections, and ultimately out of said settling channel section, including a multiple pusher having a plurality of individual pusher elements arranged sequentially, as considered in the longitudinal direction of said channel, at respective predetermined distances from one another, and extending into said channel at least during said advancement phase, and means for moving said individual pusher elements in such a manner as to contact said metered quantity, and to push the same ahead of itself through the respective channel sections during said advancement phase.

2. The machine as defined in claim 1, and further comprising at least one additional trough bounding an additional channel adjacent to, and substantially coextensive with said channel, and also having said mixing, sieving and settling channel sections, and wherein said introducing means further include means for introducing an additional metered quantity of the substance into said mixing channel section of said additional channel, and wherein said multiple pusher includes an additional plurality of individual pusher elements similar to said plurality and jointly movable therewith, and also extending into said additional channel at least during the advancement phase.

3. The machine as defined in claim 1, wherein said multiple pusher includes a carrying structure on which said individual pusher elements are rigidly mounted, and wherein said moving means includes means for causing said carrying structure with said individual pusher elements to move during each cycle in a predetermined path having an advancement stroke in said one longitudinal direction, a lifting stroke perpendicular to said direction and being withdrawn from said channel with said individual pusher elements, a return stroke opposite to said direction, and remaining withdrawn from said channel with said individual pusher elements, and a lowering stroke perpendicular to said direction, and re-entering said channel with said individual pusher elements.

4. The machine as defined in claim 3, wherein said introducing means includes means for separately introducing almond fragments and a chocolate mass in predetermined amounts into an upstream end of said mixing channel section.

5. The machine as defined in claim 3, wherein at least that of said pusher elements, which is arranged as the last one of said plurality at said settling channel section is constructed as a launching rake.

6. The machine as defined in claim 5, wherein said launching rake includes a plurality of individual tines, and further comprising means for heating said tines.

7. The machine as defined in claim 6, wherein said tines are arranged along a predetermined arcuate course.

8. The machine as defined in claim 1, further comprising an unloading conveyor arranged at said settling channel section, and wherein said settling channel section has a downstream end situated a small distance upwardly of said unloading conveyor.

9. The machine as defined in claim 1, and further comprising means for shaping the mounds at the region of said settling channel section.

10. The machine as defined in claim 1, wherein said individual pusher elements are constituted, at least at their surfaces that contact said substances during the advancement phase, of a non-adhesive material.

11. The machine as defined in claim 10, wherein said non-adhesive material is polytetrafluoroethylene.

12. The machine as defined in claim 3, wherein said carrying structure with said individual pusher elements performs a predetermined stroke during each of said advancement and return strokes which has a length corresponding to at least a single multiple of said distance between said individual pusher elements, plus a predetermined safety distance.

13. The machine as defined in claim 3, further comprising means for scraping the substance off from said individual pusher elements.

14. The machine as defined in claim 13, wherein said scraping means includes a frame guided for resilient movement with said multiple pusher opposite to said longitudinal direction along a plane located substantially centrally of said individual pusher elements, and perpendicular to the movement direction of the latter during said lifting and lowering segments, but against movement perpendicular to said plane, and a plurality of scraping wires mounted on said frame, and stretching each across the latter in line contact with that major surface of one of said individual pusher elements, which comes into contact with the substance.

15. The machine as defined in claim 1, wherein said sieving channel is vibrator-actuated.

* * * * *